United States Patent
Zhang et al.

(10) Patent No.: US 10,122,695 B2
(45) Date of Patent: Nov. 6, 2018

(54) REMOTE CROWD ATTESTATION IN A NETWORK

(71) Applicant: Cisco Technology, Inc., San Jose, CA (US)

(72) Inventors: Tao Zhang, Fort Lee, NJ (US); Yi Zheng, San Jose, CA (US); Helder F. Antunes, Morgan Hill, CA (US); Marcelo Yannuzzi, Vufflens-la-Ville (CH); Gonzalo Salgueiro, Raleigh, NC (US); Joseph Michael Clarke, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 14/924,799

(22) Filed: Oct. 28, 2015

(65) Prior Publication Data
US 2017/0126647 A1    May 4, 2017

(51) Int. Cl.
*H04L 29/06* (2006.01)
*H04L 12/26* (2006.01)
*H04W 12/10* (2009.01)
*H04W 4/70* (2018.01)

(52) U.S. Cl.
CPC .............. *H04L 63/08* (2013.01); *H04L 43/08* (2013.01); *H04L 63/123* (2013.01); *H04L 63/126* (2013.01); *H04L 63/0823* (2013.01); *H04W 4/70* (2018.02); *H04W 12/10* (2013.01)

(58) Field of Classification Search
CPC ....... H04L 63/08; H04L 63/123; H04L 67/10; H04L 43/08
See application file for complete search history.

(56) References Cited

U.S. PATENT DOCUMENTS

| 2010/0031047 | A1* | 2/2010 | Coker, II | ............ H04L 63/0281 713/176 |
| 2013/0125217 | A1 | 5/2013 | Edwards et al. | |
| 2013/0291099 | A1* | 10/2013 | Donfried | ............ G06Q 30/0637 726/22 |

(Continued)

FOREIGN PATENT DOCUMENTS

CN     103501303 A     1/2014

OTHER PUBLICATIONS

Gu et al., "Model-Driven Remote Attestation: Attesting Remote System from Behavioral Aspect", pp. 2347-2353, The 9th International conference for Young Computer Scientists, 2008.*

(Continued)

*Primary Examiner* — Eleni A Shiferaw
*Assistant Examiner* — Hee K Song
(74) *Attorney, Agent, or Firm* — Parker Ibrahim & Berg LLP; James M. Behmke; Stephen D. LeBarron

(57) ABSTRACT

In one embodiment, a first device in a network receives information regarding one or more nodes in the network. The first device determines a property of the one or more nodes based on the received information. The first device determines a degree of trustworthiness of the one or more nodes based on the received information. The first device attests to the determined property and degree of trustworthiness of the one or more nodes to a verification device. The verification device is configured to verify the attested property and degree of trustworthiness.

18 Claims, 11 Drawing Sheets

(56) References Cited

U.S. PATENT DOCUMENTS

| | | | |
|---|---|---|---|
| 2013/0298192 A1* | 11/2013 | Kumar | G06F 21/52 726/3 |
| 2014/0122873 A1 | 5/2014 | Deutsch et al. | |
| 2015/0007262 A1 | 1/2015 | Aissi et al. | |
| 2016/0381079 A1* | 12/2016 | Ben-Shalom | H04L 63/20 726/29 |

OTHER PUBLICATIONS

Ruan et al., "RepCloud: Achieving Fine-grained Cloud TCB Attestation with Reputation Systems", pp. 3-14, STC'11, 2011.*

Alexander, et al., "Remote Attestation for Cloud-Based Systems", http://www.ijiee.org/papers/179-E3019.pdf, Jul. 2012, 27 pages.

Dey, et al., "Remote Attestation for Cloud-Based Systems", CPS-VO, High Confidence Software and Systems Conference, May 6, 2015, 3 pages, http://cps-vo.org/node/19217.

Shanmugam, et al., "Attestation for Trusted Computing to Assure Security in Cloud Deployment Services", International Journal of Information and Electronics Engineering, vol. 2, No. 4, Jul. 2012, 5 pages.

Winter, et al., "RPL: IPv6 Routing Protocol for Low-Power and Lossy Networks", Request for Comments 6550, Mar. 2012, 157 pages, The Internet Engineering Task Force (IETF) Trust.

\* cited by examiner

US 10,122,695 B2

REMOTE CROWD ATTESTATION IN A NETWORK

TECHNICAL FIELD

The present disclosure relates generally to computer networks, and, more particularly, to remote crowd attestation techniques in a computer network.

BACKGROUND

Mesh networks have become increasingly popular and practical in recent years. In particular, shared-media mesh networks, such as wireless or Powerline Communication (PLC) networks, etc., are often on what is referred to as Low-Power and Lossy Networks (LLNs), which are a class of network in which both the routers and their interconnect are constrained. Notably, LLN routers typically operate with highly constrained resources (e.g., processing power, memory, power source, etc.), and communicate via links that are characterized by high loss rates, low data rates, and/or instability.

An example implementation of LLNs is an "Internet of Things" network. Loosely, the term "Internet of Things" or "IoT" may be used to refer to uniquely identifiable objects (things) and their virtual representations in a network-based architecture. In particular, the next frontier in the evolution of the Internet is the ability to connect more than just computers and communication devices, but rather the ability to connect "objects" in general, such as lights, appliances, vehicles, heating, ventilating, and air-conditioning (HVAC) devices, windows and window shades and blinds, doors, locks, etc. The "Internet of Things" thus generally refers to the interconnection of objects (e.g., smart objects), such as sensors and actuators, over a computer network, which may be the public Internet and/or a private network.

Remote attestation generally refers to the process whereby a device in a network makes a claim about certain properties of its hardware, software, and/or runtime environment to a remote verifier. To prove the trustworthiness of the properties and of the device itself, the device may also include security credentials with the reported properties (e.g., based on a hardware-based root of trust, digital signatures, certificates, etc.). However, as noted above, device resources in LLNs and other mesh networks may be considerably limited, making it impractical to perform remote attestation in many LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a first device in a network receives information regarding one or more nodes in the network. The first device determines a property of the one or more nodes based on the received information. The first device determines a degree of trustworthiness of the one or more nodes based on the received information. The first device attests to the determined property and degree of trustworthiness of the one or more nodes to a verification device. The verification device is configured to verify the attested property and degree of trustworthiness.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
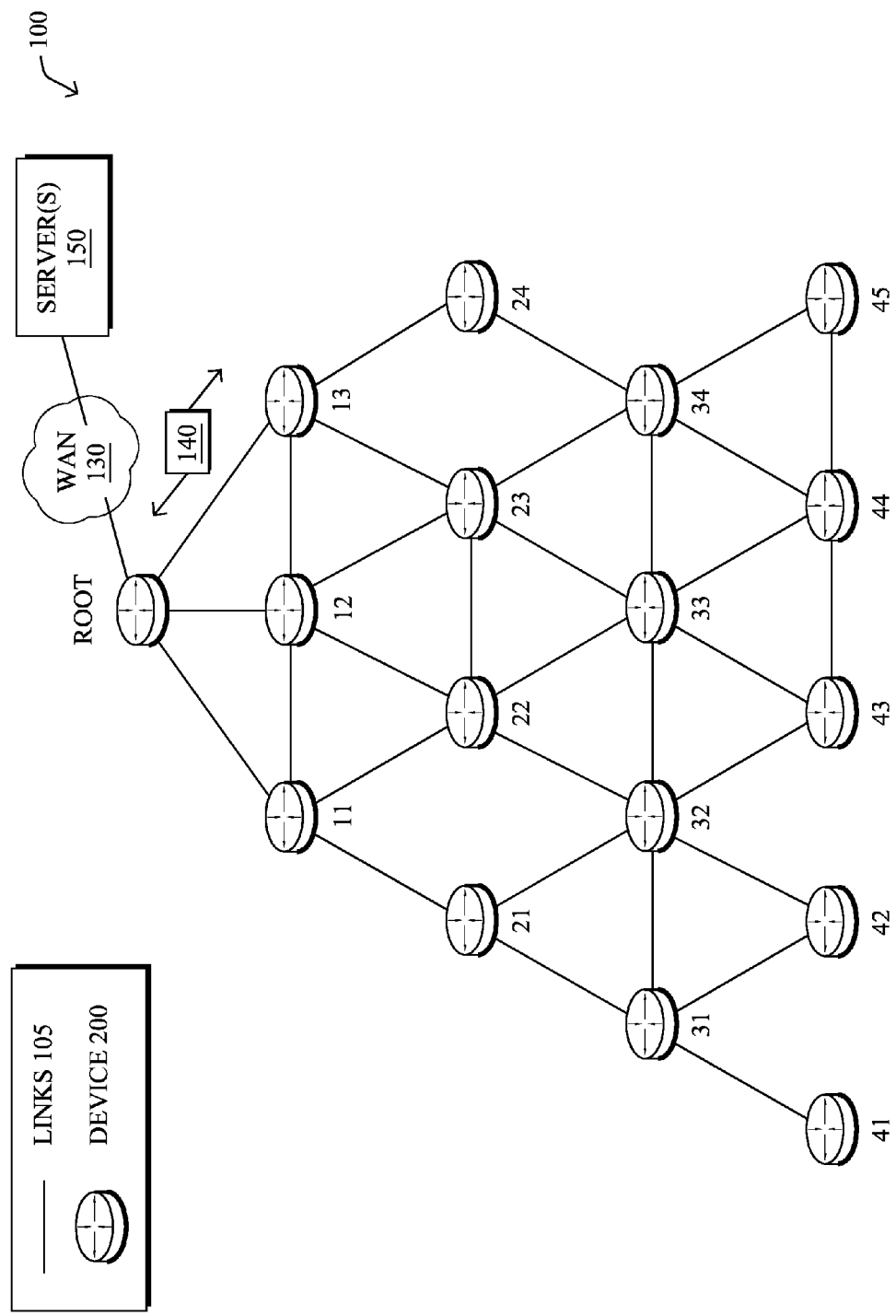
FIG. 1 illustrates an example communication network.

FIG. 1 is a schematic block diagram of an example computer network 100 illustratively comprising nodes/devices 200 (e.g., labeled as shown, a "Border Router/Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Border Router/Root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. In some embodiments, network 100 may include a plurality of Border Routers/Root nodes that form a backbone of border routers to which nodes 11-45 etc. may join for routing purposes. Those skilled in the art will understand that any number of nodes, devices, links, etc. may be used in the computer network, and that the view shown herein is for simplicity. Also, those skilled in the art will further understand that while the network is shown in a certain orientation, particularly with a "Border Router/Root" node/device, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
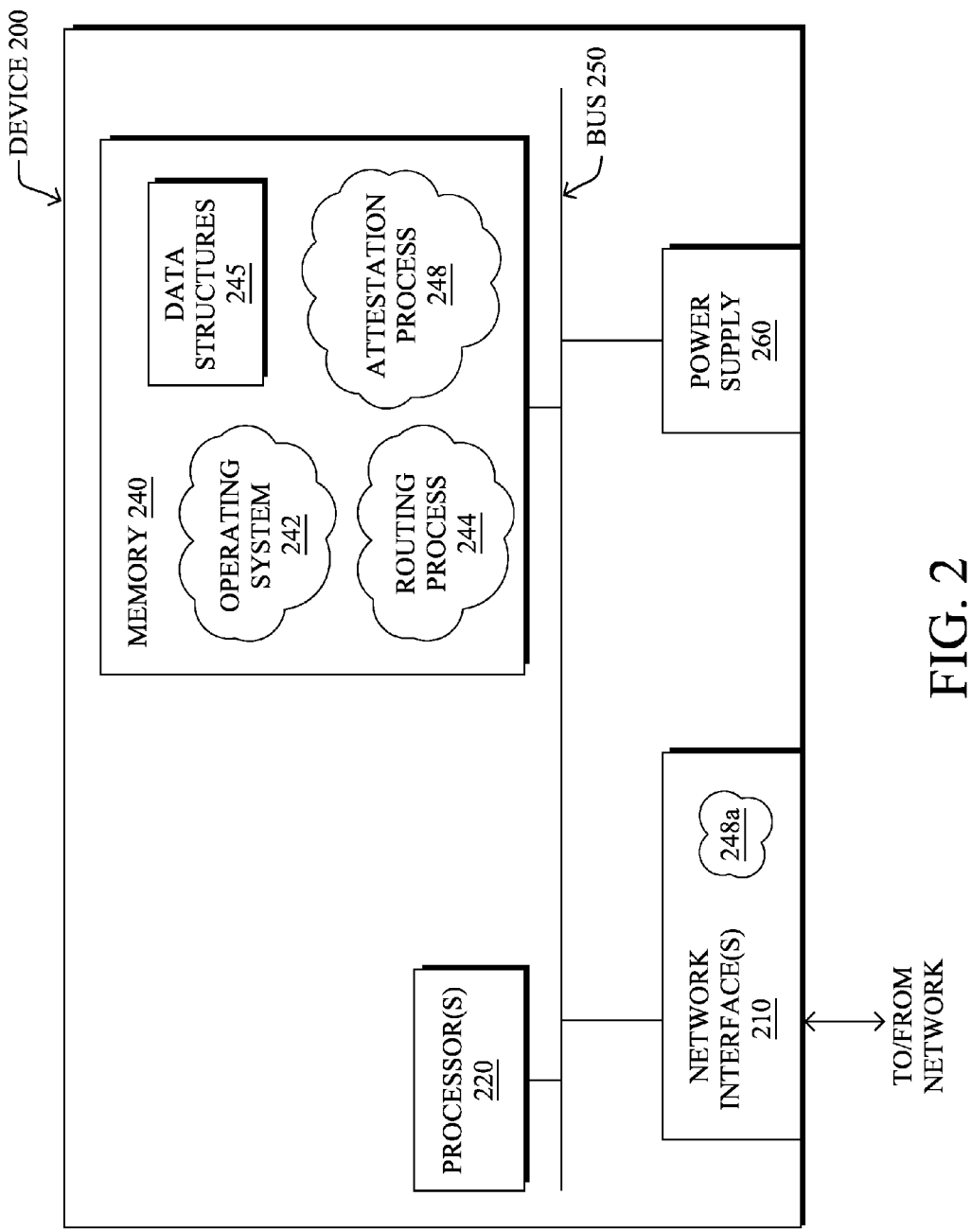
FIG. 2 illustrates an example network device/node.

FIG. 2 is a schematic block diagram of an example node/device 200 that may be used with one or more embodiments described herein, e.g., as any of the nodes and/or servers shown in FIG. 1 above (e.g., server 150, node 11, node 12, etc.). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and/or an attestation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 244) based on an Objective Function (OF). The role of the Objective Function is generally to specify rules on how to build the DAG (e.g. number of parents, backup parents, etc.).

As further noted above, many forms of devices that are typical to LLNs are not capable of self-attesting to the trustworthiness of the devices themselves or to their data. For example, a smart sensor may be configured to provide sensor data to another device in the network, but lack the computational resources to also supply credentials with the data (e.g., by digitally signing the data, etc.). Thus, many LLNs are incapable of implementing self-attestation across all of the devices in the network. Further, even if the devices/nodes in the network have sufficient resources to perform self-attestation, it may be impractical to do so from a networking standpoint due to the additional traffic load on the network, as LLNs typically also have very limited networking resources in terms of bandwidth, etc.

Remote Crowd Attestation in a Network

The techniques herein provide mechanisms referred to generally as "crowd attestation." In some aspects, only selected devices in a network may act as attesters that attest to their own properties as well as to the properties of one or more other nodes in the network. In further aspects, a hierarchical attestation architecture is introduced whereby attestations can be combined at different hierarchical levels, to ensure the trustworthiness of the entire system.

Specifically, according to one or more embodiments of the disclosure as described in detail below, a first device in a network receives information regarding one or more nodes in the network. The first device determines a property of the one or more nodes based on the received information. The first device determines a degree of trustworthiness of the one or more nodes based on the received information. The first device attests to the determined property and degree of trustworthiness of the one or more nodes to a verification device. The verification device is configured to verify the attested property and degree of trustworthiness.

Illustratively, the techniques described herein may be performed by hardware, software, and/or firmware, such as in accordance with processes 244 and 248, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Figure 3A:
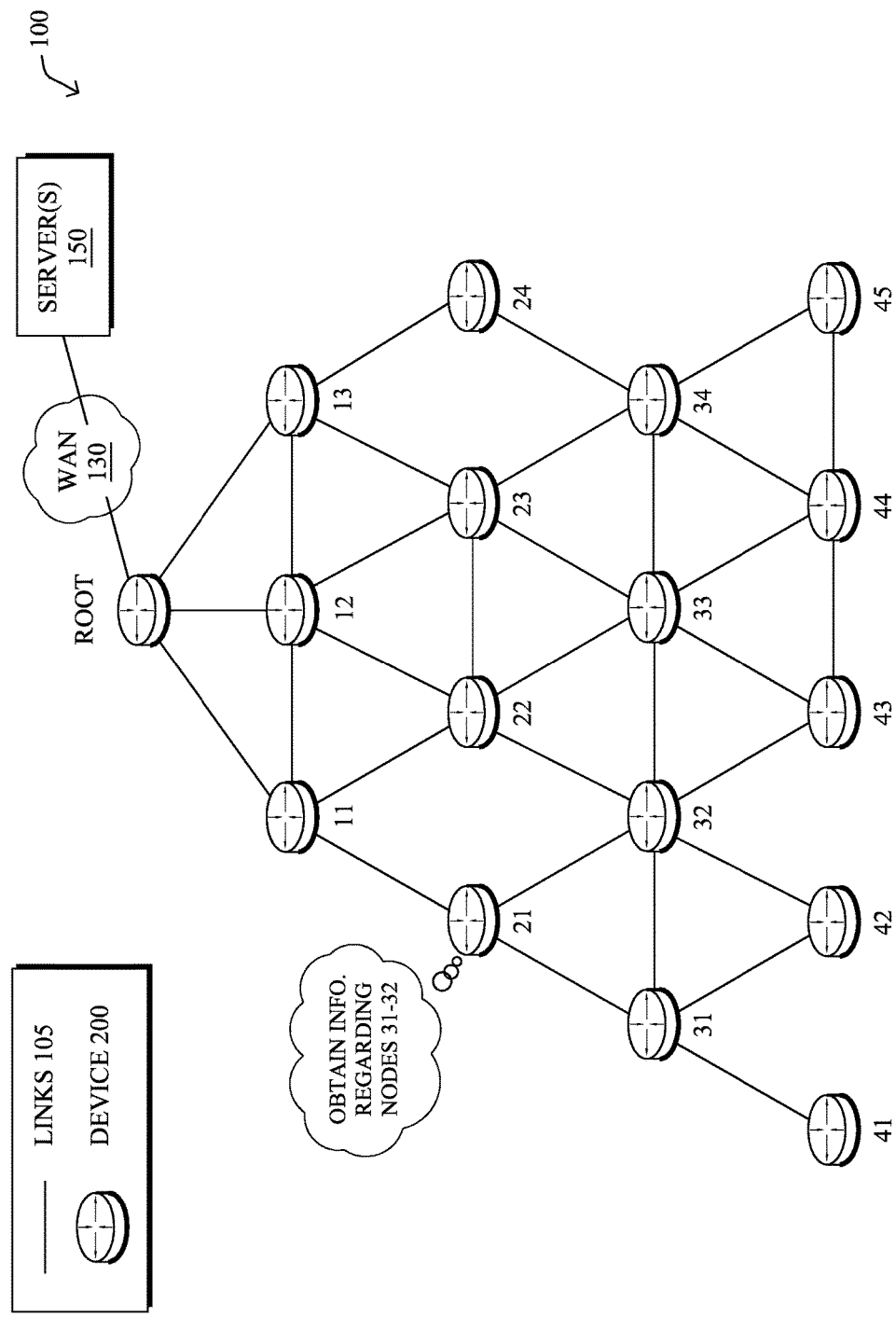
FIGS. 3A-3C illustrates examples of remote attestation in a Low-Power and Lossy Network (LLN)

Operationally, only a subset of devices in a network may be selected to act as attesters. In addition to attesting to its own trustworthiness, an attester may also attest to the behaviors of selected other devices that it can observe. For example, as shown in FIG. 3A, assume that device/node 21 has been selected to act as an attester in network 100 on behalf of one or more other devices/nodes, such as nodes 31-32. Node 21 may be selected to act as an attester for any number of different reasons. For example, nodes 31-32 may lack the capabilities to self-attest (e.g., due to heavily constrained resources, etc.), may be untrusted according to a security policy (e.g., only certain devices types, such as from particular manufacturers may be considered trustworthy), may be instructed to disable their own attestation functionality due to traffic congestion in network 100, or the like.

In various embodiments, an attester may obtain information regarding its one or more non-attesting nodes. For example, node 21 may observe traffic sent to and/or from nodes 31-32, to analyze the traffic patterns associated with nodes 31-32. Such traffic patterns can be characterized by traffic volume statistics (e.g., the peak, average, or minimum traffic volumes), traffic delay or jitter metrics, source and destination information, data regarding the ports or protocols used by the traffic, etc. In some embodiments, an attester may also be able to observe and analyze traffic patterns at the application layer in addition to, or in lieu of, at the network layer. Further information that may be gathered by an attester may include system information for the one or more nodes. For example, node 21 may gather information regarding the hardware and/or software configurations of nodes 31-32.

The set of one or more nodes for which a device is to act as an attester may be controlled via a policy distributed to the attester and/or to the one or more nodes. In one embodiment, such a policy may be a security policy that takes into account the capabilities of the nodes. For example, node 21 may act as an attester on behalf of nodes 31-32 based on a security policy that authorizes only certain devices types to act as attesters (e.g., devices from authorized manufacturers, devices specified by an administrator, etc.). Assume, for instance, that nodes 31-32 are devices manufactured by a manufacturer that is not on an approved list in the security policy. In such a case, node 21 may observe the device vendor attributes in the traffic from devices that perform similar functions (e.g., nodes 31-32) and attest whether there are unauthorized devices in the system.

In some embodiments, a security policy enforced by an attester may restrict the traffic from certain devices from leaving the local domain. For example, a gateway of the local domain (e.g., the Root node in network 100) may act as an attester as to the behaviors of the devices in the local network, to determine whether any of the local devices have been sending data to unauthorized external destinations. However, restricting traffic to the local domain may not always be practical. For example, passive listeners could be used to transmit data through a separate channel or to store captured data for a period of time, allowing the data to be retrieved later on by an external entity. This is especially problematic in wireless settings, since passive listeners can remain undetected. To counter this problem, messages can be encrypted so that the data remains unintelligible for any external system, in one embodiment.

Figure 3B:
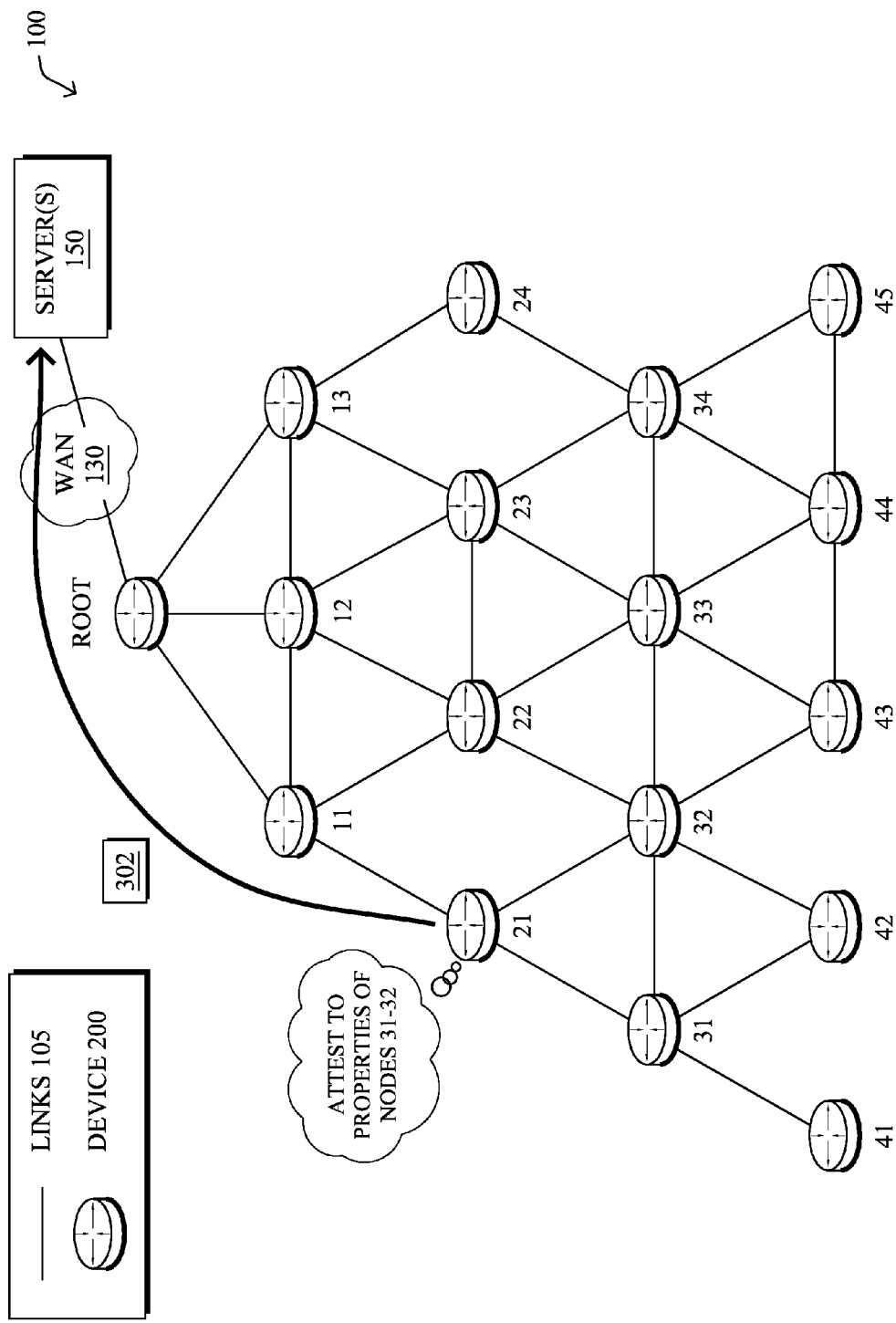

Based on the information gathered regarding the one or more nodes, the attester may determine and report on the properties and trustworthiness of the nodes to a verifier, such as a cloud-based security management system. For example, as shown in FIG. 3B, attester node 21 may provide one or more attestation report messages 302 to a verifier device in server(s) 150. Attestation report message 302 may include, for example, data indicative of the properties of nodes 31-32, as determined by node 21 (e.g., observed traffic properties, device configurations, etc.). In some embodiments, attestation report message 302 may include a summary of the observed behaviors of nodes 31-32. Further, attestation report message 302 may include data indicative of a degree of trustworthiness of nodes 31-32 and their associated properties. For example, if nodes 31-32 exhibit behavior or traffic patterns that are not expected, node 21 may indicate as such in attestation report message 302. In addition, all or a subset of attesters can be required to also attest to the trustworthiness of their own software, hardware, and/or runtime behavior. For example, attestation report message 302 may further include data that attests to a property of node 21 and/or the trustworthiness of node 21.

Attesters for which the trustworthiness of their hardware, software, and/or runtime behavior has been verified may be treated as preferred attesters, in one embodiment. When preferred attesters attest to the behaviors of other devices, their attestation reports can be weighted more than the attestation reports from non-preferred attesters (whose hardware, software, or runtime behavior have not been verified). The behaviors of preferred attesters can be further attested by their peer attesters and upper level attesters to provide additional information to the verifiers.

Devices that have better visibility into the behaviors of the overall system and more interactions with other devices are also candidates to be preferred attesters. Examples of such devices include local gateways, fog nodes, and local servers. Further, an attester, such as node 21, may use data analytics techniques to establish a baseline of the properties and metrics of the device(s) for which it is attesting (e.g., to identify such properties and metrics as normal or indicative of malicious behavior). For example, assume that node 31 has been compromised to spread malware to other nodes via lateral communications. If node 21 has established a baseline of traffic behavior for node 31, node 21 can attest as to whether the traffic from node 31 is normal or abnormal (e.g., whether node 31 is trustworthy, based on its behavior). In turn, node 21 may send an attestation report (e.g., via message 302) to the verifier, to identify node 31 as compromised. Further, if multiple attesters in the system report a similar attack pattern, the verifier(s) will have a better chance to confirm the attack and narrow down the source(s) of the attack.

Attestation reports may be sent at various times and on a pull or push basis. For example, an attester may send attestation reports to the verifier periodically, in response to a request from the verifier, or in response to detecting a significant change in the determined property of the one or more observed nodes. Similarly, the attester may attest to its own trustworthiness at various times. For example, node 21 may attest to the verifier as to its own trustworthiness when node 21 powers up, when node 21 loads a new software program to run, in response to receiving a request from the verifier, when a change is made to node 21 (e.g., a change to the file system), etc.

Attestation report messages 302 may be sent in real-time or only at certain times, according to various embodiments. For example, attestation data can be used to model a node's operational state over time. In another example, an attester may periodically collect data from its target node(s). This data can be summarized either locally or by a supervisory device and correlated to the current state of a particular target node. For example, at time $T=t_0$, assume that a particular node reports that the node is healthy. In turn, its attester(s) may capture a snapshot of the node's properties and confirm the heath of the node. At a subsequent time, $T=t_1$, assume that the node reports an unhealthy status. The historical data collected by the attester(s) can be used to objectively, quickly, and more accurately identify a root cause in the change of state because both healthy and unhealthy data is available, to paint a holistic picture of the node's progressive state. Attesters with additional resources may also provide a secure storage of important historical data, to accommodate pull request for troubleshooting and diagnostics.

Figure 3C:
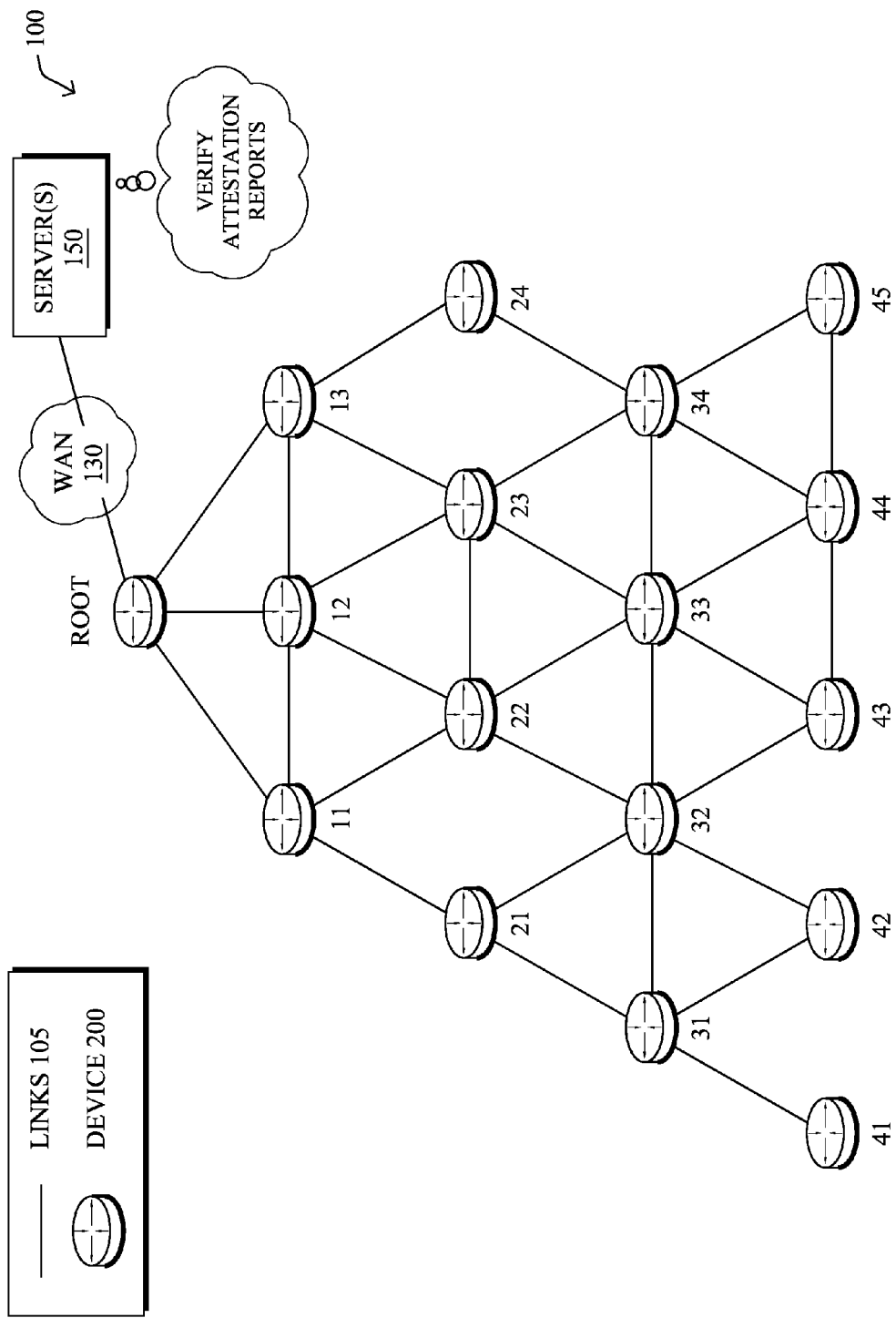

Generally, a verifier may collect attestation reports from the various attesters in the network and use the report information to evaluate the trustworthiness of the overall system, as illustrated in FIG. 3C. For example, a verifier device in server(s) 150 may cross reference traffic patterns received from the deployed attesters, to detect abnormal communication behaviors (e.g., attempts to access unauthorized destinations, etc.) and/or identify misbehaving devices (e.g., misconfigured devices, etc.). To perform such evaluations, the verifier may also combine the information from the received attestation reports with additional information received from other sources, such as the designed behaviors of the system, operational and security policies, communication principles, or any other additional threat intelligence.

According to various embodiments, an attester may determine the degree of trustworthiness of a node by comparing the property of the node to a model of the expected property. For example, if the property of a node is a behavior, the attester may compare this behavior to a behavioral model trained during a learning mode. In particular, each attester may start in a discovery/learning phase and use a learning process or other preconfigured process to construct and maintain an up-to-date profile of the behaviors of the node(s) for which the device is to act as an attester. An example of a learning mode of operation of an attester is shown in FIGS. 4A-4D.

Figure 4A:
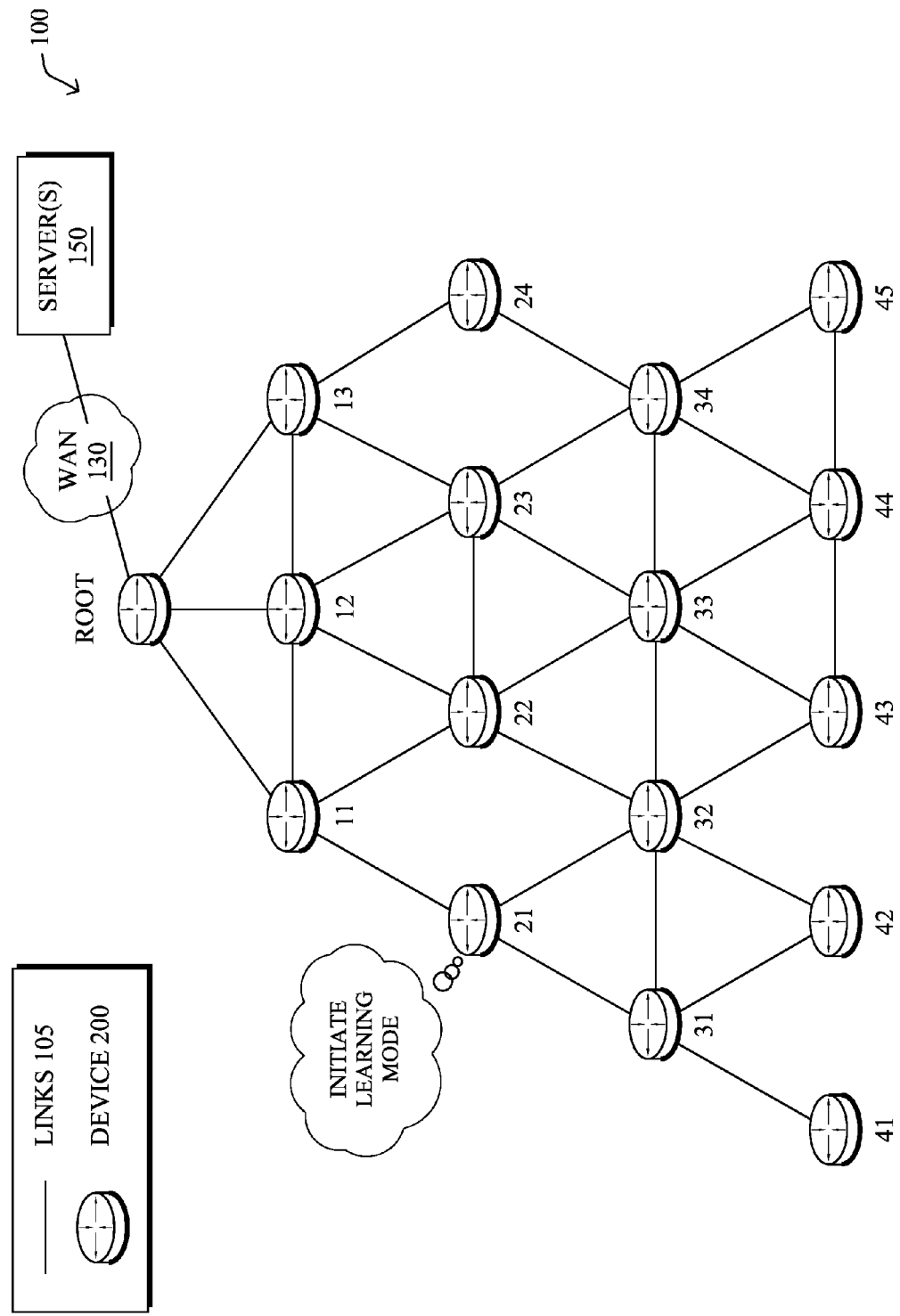
FIGS. 4A-4D illustrate examples of an attester in a learning mode of operation.
Figure 4B:
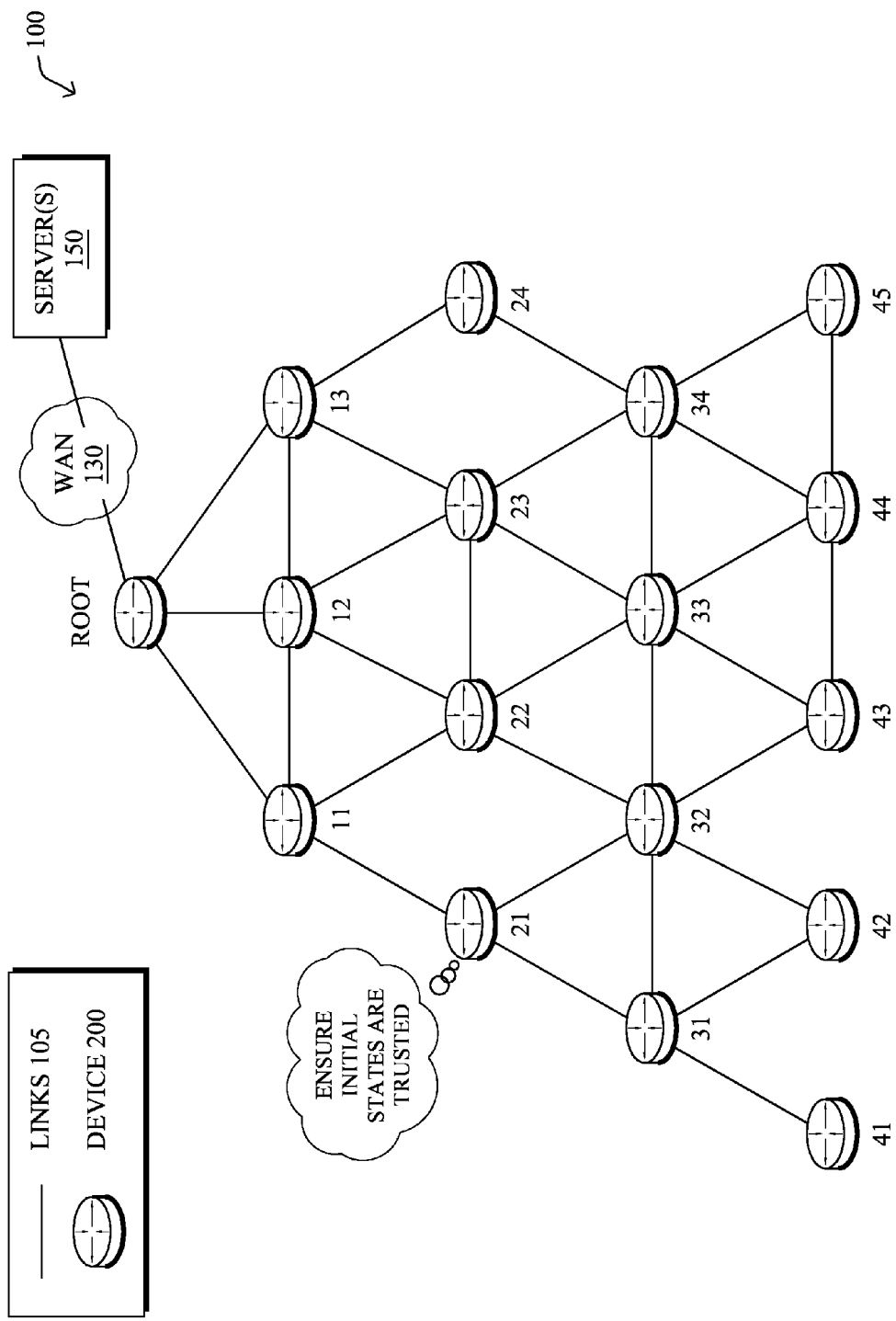
Figure 4C:
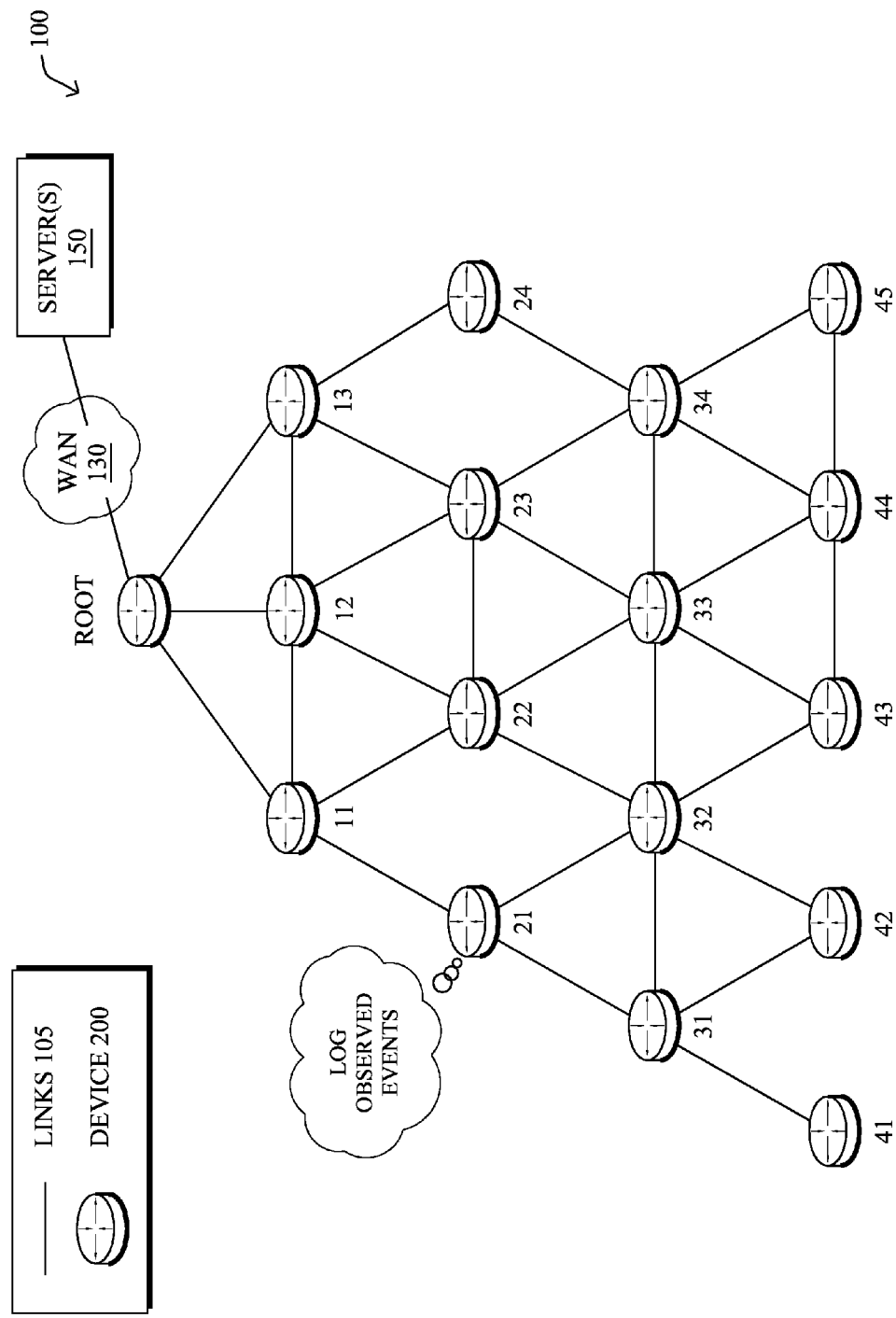
Figure 4D:
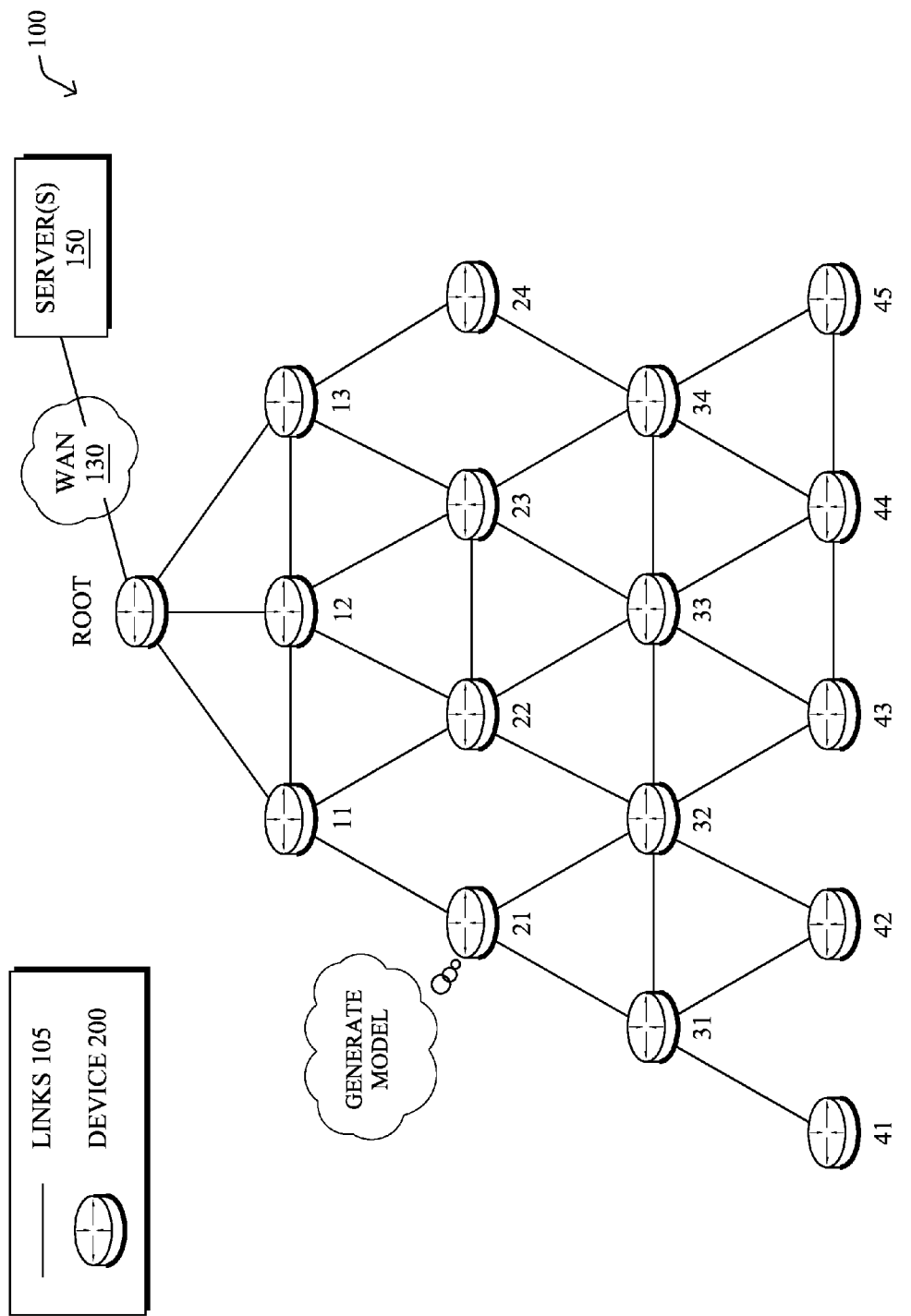

As shown in FIG. 4A, attester node 21 may enter into a learning mode on startup or in response to receiving a request to do so from the verifier in server(s) 150. As shown in FIG. 4B, node 21 may then apply any learning mode manifests with predefined policies and rules, to ensure that the initial states and behaviors of nodes 31-32 are trusted. In FIG. 4C, if the behaviors of nodes 31-32 are initially trusted, node 21 may begin observing the behaviors of nodes 31-32 and logging the observed information. Then, as shown in FIG. 4D, node 21 may generate a behavioral model for nodes 31-32 using the logged observation data regarding the behaviors of nodes 31-32.

In one embodiment, a learned behavioral model may represent the behaviors of nodes 31-32 as finite state machines (FSMs) in which nodes 31-32 transition between only a limited number of states/behaviors. For example, if node 31 is a sensor that powers on periodically, transmits a sensor value, and then powers down, node 21 may represent this behavior as a corresponding FSM in its behavioral model of node 31. In further embodiments, the behavioral model may model the incoming and/or outgoing traffic associated with nodes 31-32. For example, such a behavioral model may model the traffic volumes, source and destinations, communication times, etc. of the traffic for nodes 31-32.

Once the learning phase is completed, the filtering rules of the manifests can be removed, so there is no need to keep filters up-to-date in the future. More specifically, methods such as manifests with predefined rules can be enforced through specific gateways, to enforce a set of well-defined communication policies. However, maintaining the configurations of low-level policy rules may become unmanageable in many practical IoT contexts, especially in large-scale deployments. Abstraction mechanisms such as policies expressing the desired state, along with machine learning techniques and autonomous assessment can be used to analyze the traffic patterns at different levels, in some embodiments. For example, the FSM(s) that model the behavior of a sensor may change as a function of time (e.g., as the battery of the sensor depletes). Such states and state transitions can thus be modeled as a function of time. To this end, different mechanisms can be utilized, such as sampling and signal filtering techniques, Hausdorff distance, curve fitting and goodness, event correlation, interpolation and correlation factors, or combinations thereof. Note that any new communication may be scanned but not necessarily filtered out, as long as the system can identify the communication as trusted data exchange. Also note that any new actor can be previously attested and validated before it starts exchanging messages with already trusted devices.

In many cases, the above learning phase for an attester may be automated and transparent to network administrators. However, in some embodiments, the verifier may be configured to present the collected attestation reports to a network administrator via a user interface. In one embodiment, the verifier may also calculate and present a trustworthiness score to the administrator. In some cases, the administrator may be involved in making the final trustworthiness assessment (e.g., by disagreeing with the computed score, adjusting how the score is calculated, etc.). Further, the administrator may be able to control the learning phase for the attestation system, e.g., by identifying additional properties/metrics that should be observed. This decision may depend on specific use cases. In one embodiment, the verifier may maintain a repository of properties/metrics for observation. Such a repository may be based on lab test results specified by the network administrator (e.g., prior to deployment of the live system) and/or based on vendor-specified use cases (e.g., for different industries). Example protocols that may be used to gather properties/metrics may include, but are not limited to, Netflow records, IP Service Level Agent (IPSLA) probes, routing protocols, neighbor discovery protocols, energy management protocols, Simple Network Management Protocol (SNMP), Network Configuration Protocol (NETCONF), security audit protocols, combinations thereof, etc., and may be configured on a per-attester basis.

As would be appreciated, even when attested node properties remain valid, a compromised node could still be sending false information. This is particularly true in the case of nodes that are unable to vouch for their own trustworthiness. For example, assume that nodes 31-32 are sensors that have automatic power-off cycles configured to conserve battery power. In such a case, attester node 21 may scan the statuses of nodes 31-32 during the corresponding transmission/reception events. However, depending on the duration of the silence period, the physical location of nodes 31-32, etc., a malicious entity could replace the logic of one of the sensors during the expected silence period. Thus, node 21 may not identify the change (e.g., if properties such as the MAC address, vendor, etc. remain unchanged). Accordingly, in various embodiments, an attester may perform a deeper inspection of the traffic packets and their payloads. For example, node 21 may perform deep packet inspection (DPI) on the traffic of nodes 31-32, as part of its attestation functions.

Domain experts may also be used in network 100 to facilitate the analysis of the traffic from observed nodes. Notably, traffic data is often domain specific, meaning that the states and evolution of the data may be understood best by a domain expert. In one embodiment, a software development kit (SDK) may be used to allow such an expert to develop application-aware attesters that are able to identify data that may have been compromised and/or other suspicious behaviors.

In another potential scenario, an attester may itself become compromised, thereby forcing the attester to provide false attestation reports. In various embodiments, multiple devices may be configured to observe and attest to the properties and trustworthiness of any particular node in the network. Thus, if there is a discrepancy in the attestation reports regarding a particular node or set of nodes received by the verifier from multiple attesters in the network, the verifier can identify the potentially compromised attester (e.g., by using a majority voting mechanism to determine which devices to trust). In other implementations, such as when only the gateway/Root node is allowed to act as an attester for a pool of sensors, the sole attester may employ a more secure means of ensuring its trustworthiness. For example, if the Root node shown is the only attester in the local network, it may use a hardware-based root of trust and a corresponding security mechanism, to ensure the trustworthiness of its own software, hardware, and runtime behavior.

Figure 5:
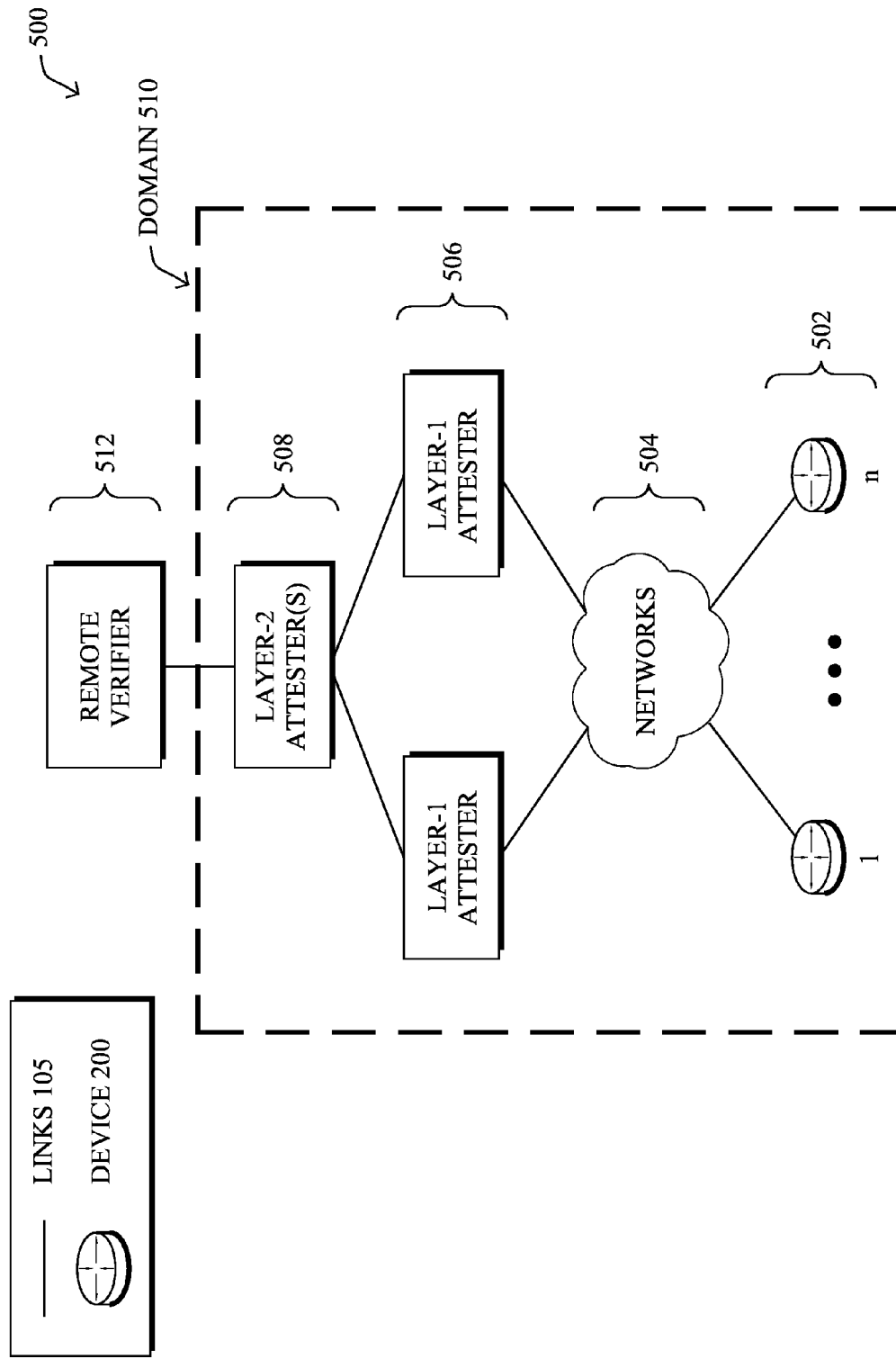
FIG. 5 illustrates a hierarchical architecture for attestation in a network.

Referring now to FIG. 5, a hierarchical architecture 500 for attestation in a network is shown, according to various embodiments. As noted above, performing attestation and validation across multiple devices may help ensure the overall trustworthiness of the system and help identify any compromised attesters.

At the very base of architecture 500 may be any number of nodes 502 (e.g., a first through nth node) that do not perform self-attestation or may only attest to certain properties. For example, nodes 502 may include sensors or other types of devices that may lack the capabilities and resources needed to perform self-attestation in the network.

At a first level in the hierarchy of architecture 500 may be any number of Layer-1 attesters 506 in communication with nodes 502 via network 504. Attesters 506 may attest to the properties and trustworthiness of the same or different nodes in nodes 502. Further, in one embodiment, different attesters 506 may attest to different properties of a particular node or set of nodes 502. For example, one of attesters 506 may vouch only for the statistical traffic patterns that it observes for a subset of nodes 502. Example specializations for attesters 506 may include, but are not limited to, application-aware attesters that attest to the behaviors of the applications executed by an observed node, and network-aware attesters that attest to the network behavior associated with the node location-aware attesters that attest to location changes of the node (e.g., by analyzing neighbor discovery protocol messages, link state advertisements, local traffic profiles, etc., to confirm that the node has indeed moved).

In some cases, Layer-1 attesters 506 may still be devices/nodes in the network that have constrained resources and may not be able to perform a more detailed analysis. For example, some of Layer-1 attesters 506 may not have sufficient resources to determine whether an observed traffic pattern indicates malicious activities. Conversely, Layer-1 attesters 506 with sufficient resources can also act as local verifiers to further determine whether the observed traffic patterns reveal abnormal or malicious activities and then vouch for their findings to the higher layer attesters or verifiers.

Above Layer-1 attesters 506 in architecture 500 may be one or more Layer-2 attesters 508. Typically, attesters at this level may be considered more trustworthy than those at Layer-1 and often have greater processing capabilities. For example, Layer-1 attesters 506 may comprise mobile devices, sensors, etc., whereas Layer-2 attesters 508 may be a FAR that can be better secured and may have additional computational and storage resources.

Moving up the attestation hierarchy of architecture 500 provides a recursive exposure to more secured environments and computationally sophisticated devices. In particular, Layer-2 attester 508 can attest to the properties/characteristics of the combined traffic represented in the attestation reports from the Layer-1 attesters 506. In one embodiment, the Layer-2 attester 508 may also act as a local verifier for the Layer-1 attesters 506. For example, the Layer-2 attester 508 may analyze the attestation reports is from Layer-1 attesters 506, potentially combined with information from other sources, to detect abnormal or malicious activities. For instance, if one of the attestation reports from a particular Layer-1 attester conflicts with the reports from other related Layer-1 attesters, the Layer-2 attester may determine that the trustworthiness of the particular Layer-1 attester is low and potentially flag this attester as compromised. Further, devices that can only send, but not receive, data may attest to their own trustworthiness. This may lead to more trustworthy attestation reports, to help the verifiers to detect false attestations.

The one or more Layer-2 attesters 508 may attest to their findings to even higher layer attesters or remote verifiers. For example, as shown, Layer-2 attester 508 may provide its findings to a remote verifier 512 (e.g., in servers 150). As would be appreciated, the hierarchy shown in FIG. 5 is for purposes of illustration only and any number of layers of attesters and verifiers may be used in other embodiments.

At each layer of the hierarchy in architecture 500, the devices may form a mesh of attesters amongst each other so that there is a maximum amount of visibility to all device attributes (e.g., processor load, traffic patterns, bandwidth usage, software version, energy management, etc.) at that layer. In this context, a mesh means that every device tries to attest to every other device at that layer, to maximize the number of attesters. Doing so helps to build a more accurate profile of trustworthiness, and facilitate identification of false attestation reports with a particular layer. However, it may only be practical to select designated nodes to be attesters. Therefore, architecture 500 affords a high degree of flexibility to balance between level of visibility and efficiency.

In some embodiments, architecture 500 may be applied to a fog computing environment. Generally, fog computing, in contrast to cloud computing, distributes the computing, storage, and networking services to the network edge and closer to the end users. For example, consider a fog domain 510 that includes various devices that provide services to a set of endpoints. A subset of these nodes can act as attesters to attest to the properties of the fog domain 510, as well as their own properties. Each attester can collect attestation reports from the endpoints, routers, switches, local servers, and other attesters inside fog domain 510 and use the information in these reports to assess the properties or trustworthiness of fog domain 510. The highest layer attester(s) in fog domain 510 (e.g., Layer-2 attester 508 shown) then vouches for its assessment to the remote verifier 512. In turn, verifier 512 may aggregate the attestation reports from the different attesters and use various techniques, such as machine-learning techniques, to validate the trustworthiness of the device based on security policies.

In various embodiments, architecture 500 can be mapped to map a crowd attestation topology to the network, based on which devices are observed nodes, attesters, and/or verifiers. A verifier may be configured to update and calculate the attestation topology in real-time. In addition, each node may have a native trustworthiness value that is based on its self-attestation as to its own hardware, software, and runtime behavior. The "trustworthiness score" of each node is then calculated based on its native trustworthiness value, as well that the attestations of other devices. The trustworthiness score for the devices that do not have the capability to vouch for themselves may be derived based on attestations by others devices. In the case of overlays, where it might not be possible to monitor and vouch for intermediate nodes along the path, encryption mechanisms can be utilized to prevent man-in-the-middle attacks. Overlays are typically used in IoT settings that combine fog and cloud computing (e.g., by implementing tunneling techniques between fog nodes and cloud nodes).

As would be appreciated, hierarchical crowd attestation additionally provides diagnostic and serviceability use-cases. In particular, multiple attesters can provide differing views of the same node, to provide a holistic picture of the node's current state and health based on particular attestation properties and metrics. For example, in a wireless mesh deployment, if one node is experiencing excessive loss, other nodes can help rule out locational or environmental effects, to help determine the cause of the loss.

Attesters in architecture 500 can also maintain a set of policy directives or statements. As consensus is reached at a particular layer in architecture 500, devices can choose to apply these policy directives. For example, attesters 506 may decide to quarantine a misbehaving device, apply a performance optimization, initiate corrective measures, etc. Additionally, after such a policy is applied, crowd attestation can be used to assure that the policy was applied properly and the node is operating as intended under the applied policy.

Figure 6:
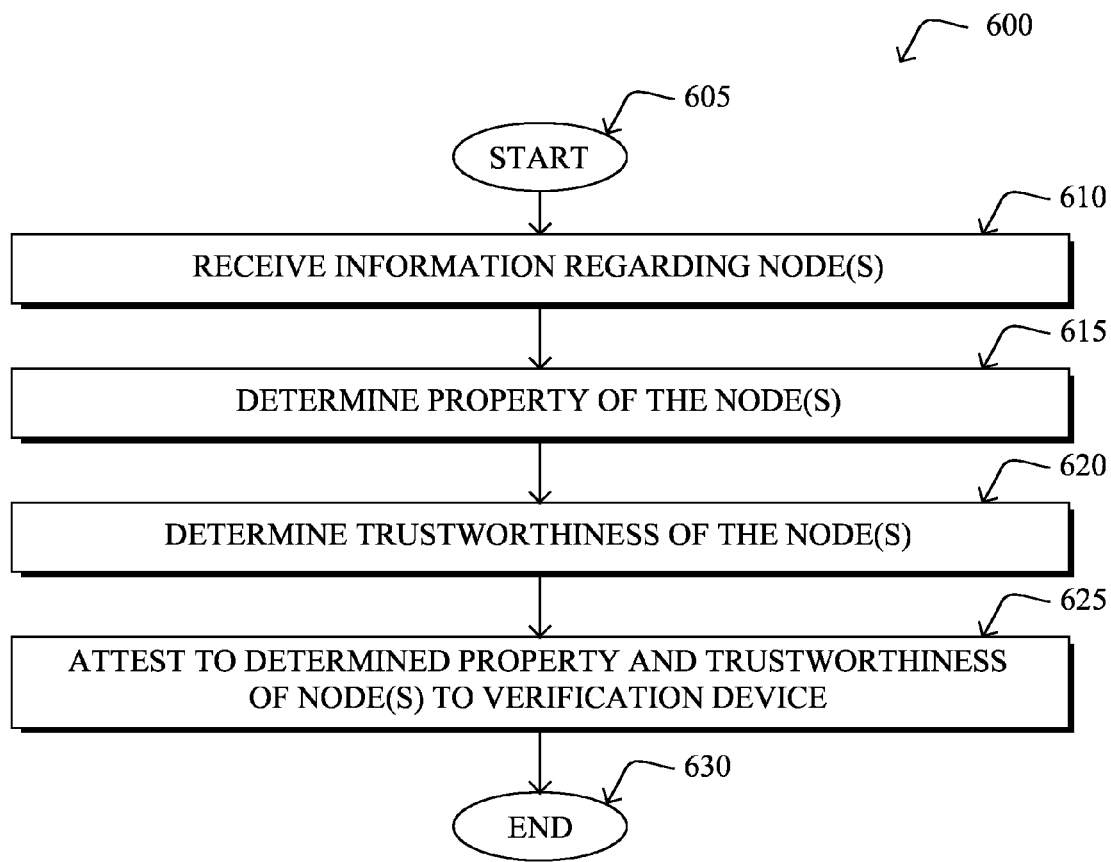
FIG. 6 illustrates an example simplified procedure for performing remote attestation in a network.

FIG. 6 illustrates an example simplified procedure for performing remote attestation in a network in accordance with one or more embodiments described herein. The procedure 600 may start at step 605, and continues to step 610, where, as described in greater detail above, a device may receive information regarding one or more nodes in the network. Generally, such a device may be configured to attest to the behavior and trustworthiness of the one or more devices. The received information may be received by the device via one or more protocols used in the network such as, e.g., routing protocols, network management protocols, neighbor discovery protocols, etc.

At step 615, as detailed above, the device may determine a property of the one or more nodes based on the received information. In various embodiments, the property may include at least one of: a hardware configuration, a software configuration, a physical location, or a traffic pattern of the one or more nodes. For example, the device may observe traffic to and/or from the one or more nodes, to determine a traffic pattern of the nodes. In some cases, the pattern may even be application-specific (e.g., the device monitors HTTP traffic of the nodes, etc.). In another example, the device may determine whether a particular node is still located in a particular physical area, based on information received via a neighbor discovery protocol, link state advertisements, observed traffic, or the like. In various embodiments, the determined property may be a raw, observed property (e.g., the make and model of the node) or may be calculated based on observations regarding the node (e.g., a computed traffic metric, etc.).

At step 620, the device may determine a degree of trustworthiness of the one or more nodes, based on the received information regarding the one or more nodes, as described in greater detail above. In some cases, the one or more nodes may not be operable to attest as to their own trustworthiness. In such cases, the device may determine the degree of trustworthiness of the one or more nodes based on the configurations of the nodes, the device types of the nodes, the observed behavior of the nodes, etc. In further cases, the device may analyze these factors, to confirm the trustworthiness of a node that attests to its own trustworthiness.

In one embodiment, the device may select which of the nodes to observe, based on a security policy. For example, certain device types may be more trustworthy and may not require a high degree of oversight by the device. In other embodiments, the device may compare the behavior of the nodes, as indicated by the received information regarding the one or more nodes, to a behavioral model. For example, the device may train a behavioral model while in a training mode and compare the current behavior of the node(s) to the model. Such a model may, for instance, infer the states of operation of the observed nodes and construct an FSM to represent the state transitions.

At step 625, as detailed above, the device may attest the determined property and degree of trustworthiness of the node(s) to a verification device. In various embodiments, the verification device may be configured to verify the attested property and degree of trustworthiness. For example, the verification device may compare attestation reports from any number of attesters that observe the one or more nodes, to verify that the attestation report sent by the device is accurate. In some embodiments, this comparison may even compare different types of properties from the different attesters. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, enable a system to attest to its properties and trustworthiness remotely and without requiring each individual device in the system to attest to its own properties and trustworthiness. Such techniques are particularly useful for resource-constrained systems, systems that include a large number of devices, and brownfield installations that have devices with long life cycles or cannot be easily upgraded to support attestation capabilities. In further aspects, the techniques herein allow only a small subset of the devices in a network to attest the trustworthiness of the whole system, without significant impact to the system performance. Notably, attestations and/or validations may be performed locally in the network, without requiring additional bandwidth and time to perform these functions in the cloud. In further aspects, the techniques herein facilitate system support and diagnostic functions by allowing other devices to collect real-time and historical attestation information, to accurately diagnose problems, initiate corrective measures, and verify operational changes.

While there have been shown and described illustrative embodiments that provide for attestation mechanisms in a communication network, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of networks and/or protocols (e.g., wireless).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a first device in a network, information regarding plurality of nodes in the network, wherein the network is an implementation of Low-Power and Lossy Networks (LLNs);
determining, by the first device, a property of the one or plurality of nodes based on the received information, wherein the property of the plurality of nodes comprises at least one of: a hardware configuration, a software configuration, a physical location, or a traffic pattern of the one or more nodes;
observing, by the first device, a behavior of the plurality of nodes;
constructing, by the first device, a behavioral model based on the observed behavior;
determining, by the first device, a degree of trustworthiness of the plurality of nodes based on the received information by comparing the determined property to the behavioral model;
ensuring, by the first device, a degree of trustworthiness of the observed behavior; and
attesting, by the first device, to the determined property and degree of trustworthiness of the plurality of nodes to a verification device, wherein the verification device is configured to verify the attested property and degree of trustworthiness as part of a hierarchy of attester devices in the network.

2. The method as in claim 1, wherein the verification device is further configured to attest to the property and degree of trustworthiness of the plurality of nodes to a higher level attester device in the hierarchy.

3. The method as in claim 1, wherein the behavioral model was constructed by the first device while in a learning mode.

4. The method as in claim 1, wherein the behavioral model comprises an inferred finite state machine (FSM) that models the observed behavior of the plurality of nodes.

5. The method as in claim 1, further comprising:
selecting, by the first device, the plurality of nodes based on a security policy, wherein the security policy identifies a set of trusted device types.

6. The method of claim 1, further comprising:
comparing the received information regarding the plurality of nodes to a history of information regarding the plurality of nodes.

7. An apparatus, comprising:
one or more network interfaces to communicate with a network;
a processor coupled to the network interfaces and configured to execute one or more processes; and
a memory configured to store a process executable by the processor, the process when executed configured to:
receive information regarding a plurality of one or more nodes in the network, wherein the network is an implementation of Low-Power and Lossy Networks (LLNs);
determine a property of the plurality of nodes based on the received information, wherein the property of the plurality of nodes comprises at least one of: a hardware configuration, a software configuration, a physical location, or a traffic pattern of the one or more nodes;
observe a behavior of the plurality of nodes;
construct a behavioral model based on the observed behavior;
determine a degree of trustworthiness of the plurality of nodes based on the received information by comparing the determined property to the behavioral model;
ensure a degree of trustworthiness of the observed behavior; and
attest to the determined property and degree of trustworthiness of the plurality of nodes to a verification device, wherein the verification device is configured to verify the attested property and degree of trustworthiness as part of a hierarchy of attester devices in the network.

8. The apparatus as in claim 7, wherein the verification device is further configured to attest to the property and degree of trustworthiness of the plurality of one or more nodes to a higher level attester device in the hierarchy.

9. The apparatus as in claim 8, wherein the behavioral model was constructed by the first device while in a learning mode.

10. The apparatus as in claim 7, wherein the behavioral model comprises an inferred finite state machine (FSM) that models the observed behavior of the plurality of nodes.

11. The apparatus as in claim 7, wherein the process when executed is further configured to:
select the plurality of nodes based on a security policy, wherein the security policy identifies a set of trusted device types.

12. The apparatus as in claim 7, wherein the process when executed is further configured to:
compare the received information regarding the plurality of nodes to a history of information regarding the plurality of nodes.

13. A tangible, non-transitory, computer-readable media having software encoded thereon, the software when executed by a processor configured to:
receive information regarding plurality of nodes in the network, wherein the network is an implementation of Low-Power and Lossy Networks (LLNs);
determine a property of the plurality of nodes based on the received information, wherein the property of the plurality of nodes comprises at least one of: a hardware configuration, a software configuration, a physical location, or a traffic pattern of the plurality of nodes;
observe a behavior of the plurality of nodes;
construct a behavioral model based on the observed behavior;
determine a degree of trustworthiness of the plurality of nodes based on the received information by comparing the determined property to the behavioral model;
ensure a degree of trustworthiness of the observed behavior; and
attest to the determined property and degree of trustworthiness of the plurality of nodes to a verification device, wherein the verification device is configured to verify the attested property and degree of trustworthiness as part of a hierarchy of attester devices in the network.

14. The computer-readable media as in claim 13, wherein the verification device is further configured to attest to the property and degree of trustworthiness of the plurality of nodes to a higher level attester device in the hierarchy.

15. The computer-readable media as in claim 13, wherein the behavioral model was constructed by the first device while in a learning mode.

16. The computer-readable media as in claim 13, wherein the behavioral model comprises an inferred finite state machine (FSM) that models the observed behavior of the plurality of nodes.

17. The computer-readable media as in claim 13, wherein the software when executed by the processor is further configured to:
select the plurality of nodes based on a security policy, wherein the security policy identifies a set of trusted device types.

18. The computer-readable media of claim 13, wherein the software when executed by the processor is further configured to:
compare the received information regarding the plurality of nodes to a history of information regarding the plurality of nodes.

* * * * *

UNITED STATES PATENT AND TRADEMARK OFFICE
CERTIFICATE OF CORRECTION

PATENT NO. : 10,122,695 B2
APPLICATION NO. : 14/924799
DATED : November 6, 2018
INVENTOR(S) : Tao Zhang et al.

Page 1 of 1

It is certified that error appears in the above-identified patent and that said Letters Patent is hereby corrected as shown below:

In the Specification

In Column 11, Line 12, please amend as shown:
508 may analyze the attestation reports from Layer-1

Signed and Sealed this
Twenty-second Day of September, 2020

Andrei Iancu
*Director of the United States Patent and Trademark Office*